United States Patent [19]
Friend

[11] 3,820,680
[45] June 28, 1974

[54] TORQUE-LIMITING DEVICE

[75] Inventor: Dawson Friend, Connersville, Ind.

[73] Assignee: Stant Manufacturing Company, Inc., Connersville, Tenn.

[22] Filed: Nov. 20, 1972

[21] Appl. No.: 307,820

[52] U.S. Cl. ............ 220/39 R, 220/44 R, 220/46 R
[51] Int. Cl. .......................................... B65d 41/04
[58] Field of Search .......................... 220/46, 39, 44

[56] References Cited
UNITED STATES PATENTS

| | | | |
|---|---|---|---|
| 1,656,241 | 1/1928 | Schwartz | 220/39 R |
| 2,243,290 | 5/1941 | Schwartz | 220/39 R |
| 2,643,790 | 6/1953 | Quillinan | 220/39 R |
| 2,879,914 | 3/1959 | Fleckenstein | 220/46 R |
| 3,149,744 | 9/1964 | Pentesco | 220/39 R |
| 3,203,445 | 8/1965 | McCormick | 220/44 R |
| 3,746,209 | 7/1973 | Urban | 220/46 R |

FOREIGN PATENTS OR APPLICATIONS

| | | | |
|---|---|---|---|
| 461,188 | 2/1937 | Great Britain | 220/39 |
| 557,859 | 5/1958 | Canada | 220/39 |

*Primary Examiner*—William I. Price
*Assistant Examiner*—Ro E. Hart
*Attorney, Agent, or Firm*—Hood & Coffey

[57] ABSTRACT

A valved cap for closing a chamber having a filler neck formed to provide an internal thread and a peripherally extending lip at its mount, the cap comprising a housing formed to provide, at its outer end portion, an outwardly extending flange and, extending axially inwardly from the flange, a shank with a mating external thread. A concentric sealing ring is disposed adjacent the flange for sealing engagement with the lip, and a shell covers at least the outer portion of the housing and is rotatable relative to the housing about the axis of the shank. The flange provides at least one resilient finger having a lug at its distal end, and the shell provides at least one pocket for receiving the lug and providing a driving connection between the shell and the housing. This pocket is formed with a camming surface at its trailing end as the shell is turned to advance the shank inwardly and an abrupt surface at its leading end. The camming surface is effective to cam the lug out of the pocket to break the driving connection when the torque resistance to rotation of the housing in the said one direction exceeds a predetermined level.

11 Claims, 7 Drawing Figures

PATENTED JUN 28 1974  3,820,680
SHEET 2 OF 2
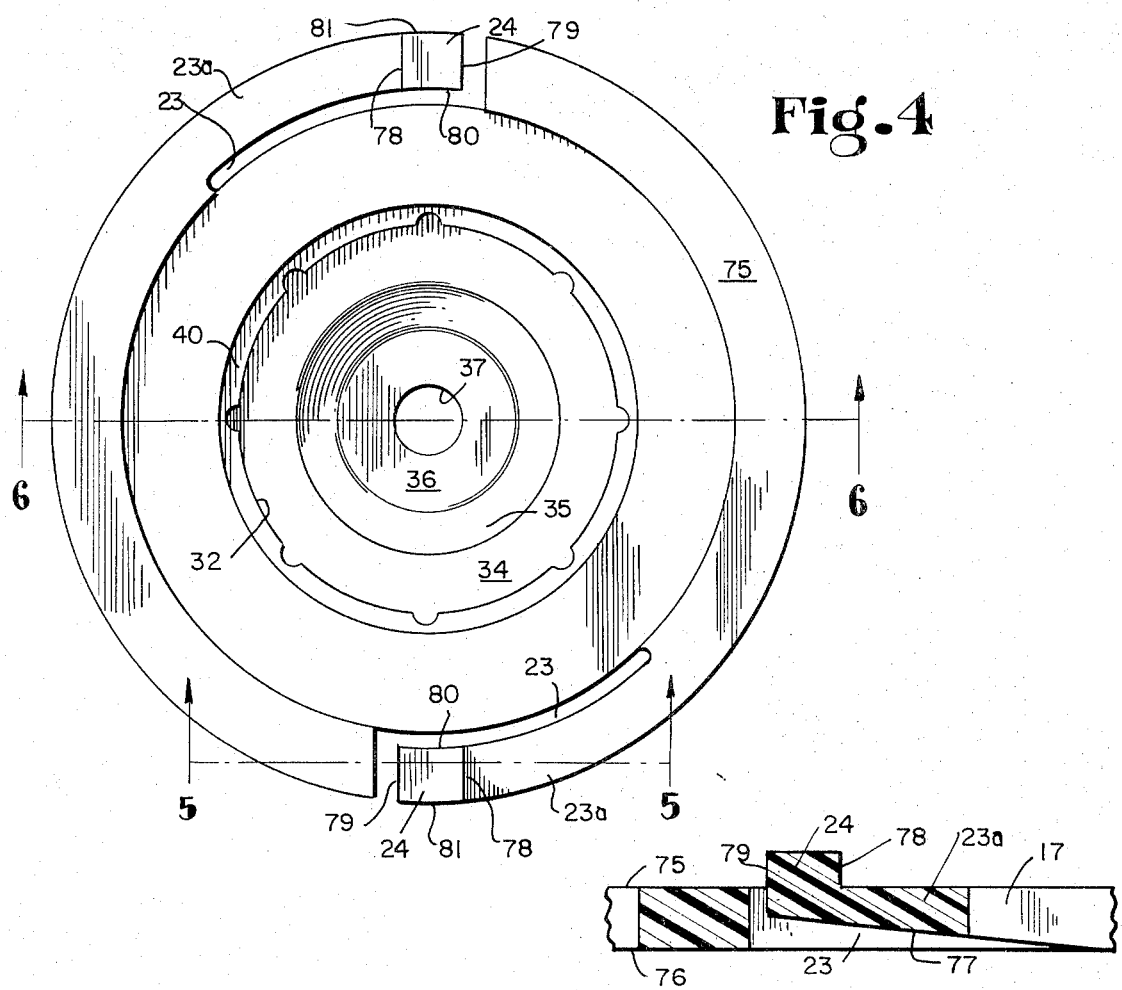
Fig.4
Fig.5
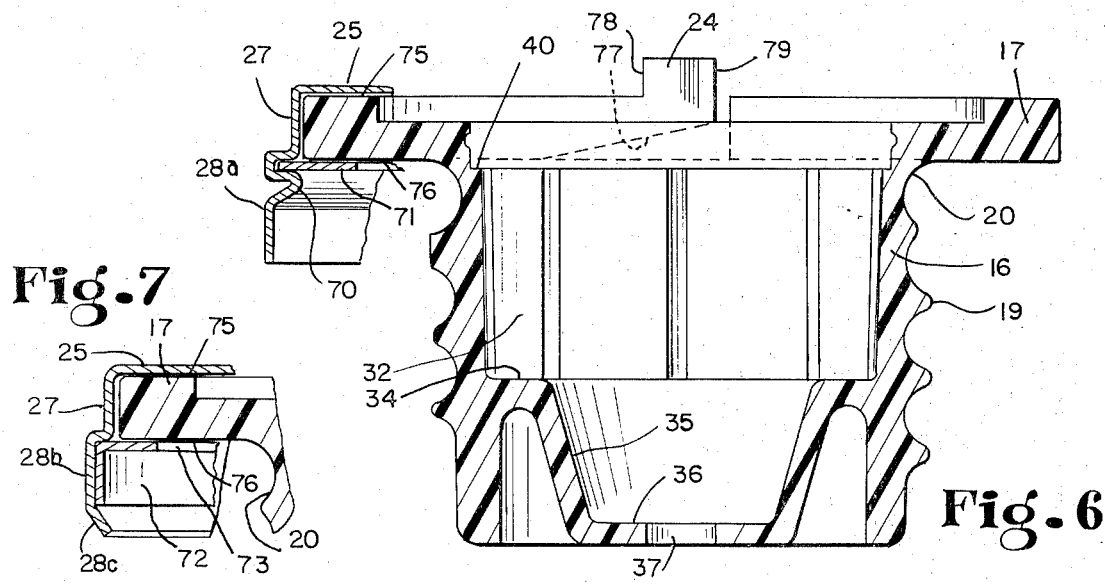
Fig.7
Fig.6

TORQUE-LIMITING DEVICE

The present invention relates to caps, and more particularly to the provision of closure caps which are threaded onto filler necks and which are provided with O-ring seals for sealing engagement with the lip of the necks.

The use of O-ring seals and other types of relatively soft, rubber-like or rubberoid gaskets to provide a seal between a closure cap and the mouth of a container presents a problem when the cap is to be removed and placed back on the neck frequently. The problem is that the seal becomes damaged when excessive tightening torque is applied to the cap. Others have heretofore attempted to solve this problem by providing torque-limiting devices for screw-on closure caps.

I believe that my torque-limiting device is a significant improvement over the devices heretofore proposed.

A primary object of my invention is to provide a valved cap for closing an automobile gasoline tank, said cap comprising a valve housing which threads into the filler neck and a shell which covers at least the outer portion of the valve housing with torque-limited means providing a driving connection between the shell and the housing in the direction which advances the housing into engagement with the filler neck. An O-ring seal is carried by the housing for sealing engagement with the lip of the filler neck.

Thus, in accordance with my present invention, the torque which can be applied to tighten the housing and the sealing ring is limited to a value which will not damage the sealing ring. Preferably, the means which provides the driving connection between the shell and the valve housing provides a firm driving connection in the direction which disengages the valve housing from the filler neck, i.e., which moves the sealing ring away from the mouth of the filler neck.

It is another object of my invention to provide such a valve housing which is integrally formed out of plastic and which provides, at its outer end portion, an outwardly and peripherally extending flange having at least one peripherally extending resilient finger with a lug at its distal end which extends into a pocket formed in the shell enclosing the housing to provide a driving connection between the shell and the housing. This connection is torque limited because the pocket is formed with a camming surface at its trailing end as the shell is turned in the said one direction to advance the sealing ring into engagement with the mouth and an abrupt surface at its leading end, the camming surface being effective to cam the lug out of the pocket to break the driving connection between the shell and the housing when the torque resistance to rotation of the housing in the said one direction exceeds a predetermined level.

Other objects and features of the invention will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 4 is a plan view of the preferably plastic housing member which provides the threaded shank which extends into the filler neck;

FIG. 5 is a fragmentary sectional view taken from FIG. 4 generally along the lines 5—5;

FIG. 6 is a sectional view taken from FIG. 4 generally along the lines 6—6; and

FIG. 7 is a fragmentary sectional view showing still another technique for connecting the shell to the housing.

Figure 1:
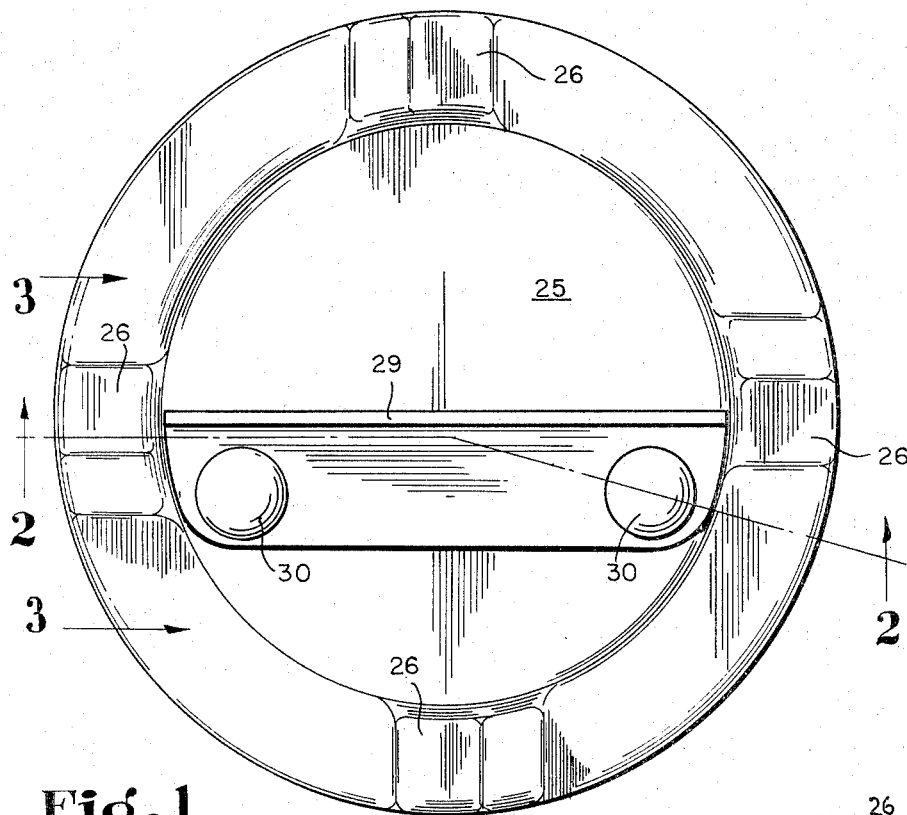
FIG. 1 is a plan view of a closure cap constructed in accordance with my present invention.

Referring now to the drawings, it will be seen that I have illustrated a filler neck indicated generally by the reference numeral 10 provided by a generally cylindrically shaped shell 11 formed to provide, adjacent its outer end portion, an internal thread 12 and, at its outer portion, an outwardly turned lip 13. My cap, indicated generally by the reference numeral 14, for closing the filler neck 10 comprises a housing or housing member 16 formed to have, at its outer end portion, an outwardly and peripherally extending flange 17 and an axially inwardly extending shank 18 providing an external mating thread 19. The housing member 16 is also formed with a peripherally extending groove 20 adjacent the axially inner side of the flange 17 and in which is disposed an O-ring 22 proportioned and designed sealably to engage the lip 13 when the housing member is threaded into the filler neck to the position shown in FIG. 2.

As best seen in FIG. 4, the flange 17 is formed with a pair of oppositely disposed peripherally extending slots 23 providing peripherally extending spring-like fingers 23a carrying at their distal ends locking lugs 24. A metal shell 25 covers at least the outer portion of the housing member 16, this shell providing four peripherally spaced apart pockets 26 for receiving the lugs 24. As will be more fully discussed hereinafter, the engagement of the lugs 24 in the pockets 26 provides a driving connection between the shell 25 and the housing member 16, which driving connection is torque-limited to prevent damaging the O-ring 22.

Figure 2:
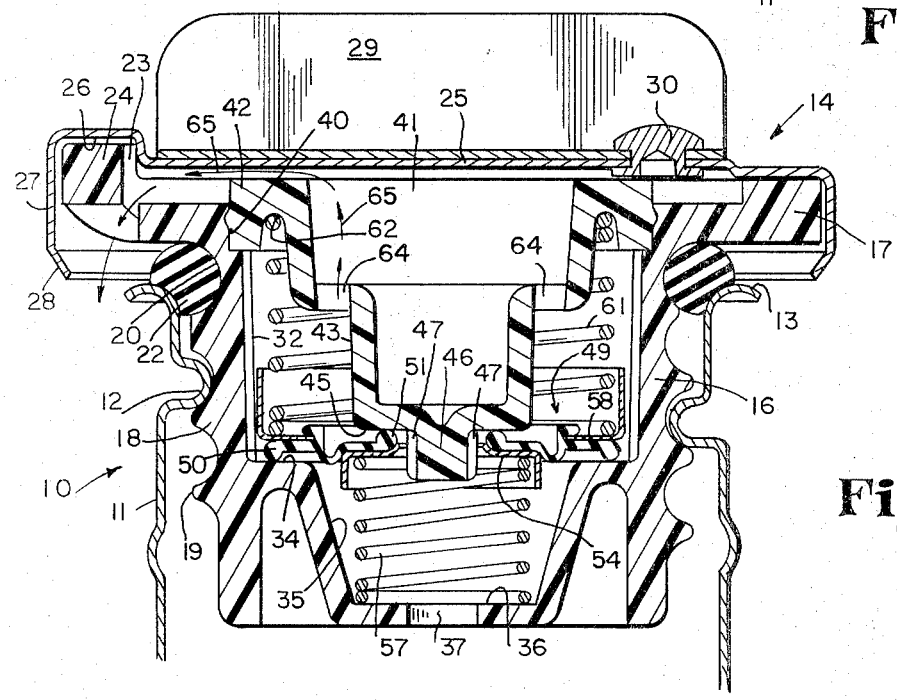
FIG. 2 is a sectional view taken from FIG. 1 generally along the lines 2—2.

In the embodiment of FIG. 2, the shell 25 is formed to have a peripheral depending skirt 27, the inner portion 28 of which is turned in to capture the flange 17 within the shell. An ear 29 is riveted to the upper surface or outer surface of the shell 25 as indicated at 30 to provide means for turning the shell, thereby turning the housing member 16.

The shank 18 has a valved passageway extending axially therethrough. The outer, larger portion of this passageway is indicated at 32. As best seen in FIGS. 4 and 5, this passageway portion 32 is concentric and axially inwardly extending. The shank 18 provides a peripherally and inwardly extending, outwardly facing annular seat 34 at the inner end of the passageway portion 32, and, extending inwardly from the seat 34, a tapered portion 35 which terminates with an inwardly and peripherally extending spring seat 36 having a concentric vent opening 37 therein.

The outer end of the passageway portion 32 is provided with a rabbet 40. An insert 41 having a peripherally extending mounting flange 42 received in the rabbet 40 is provided, this insert having a shank portion 43 extending axially inwardly. The shank portion 43 provides, spaced outwardly from the seat 34, a concentric annular inwardly facing seat 45 and a reduced portion 46 extending axially inwardly a short distance from the seat 45, this reduced shank portion 46 being provided with peripherally spaced apart, axially extending grooves as indicated at 47.

In the illustrative embodiment, the valve gasket means 49 includes an annular, flexible gasket or diaphragm 49 formed to provide an outer, peripherally extending bead 50 in sealing engagement with the seat 34 and an inner peripherally extending bead 51 in sealing engagement with the seat 45.

A seal plate 54 is disposed between a vacuum spring 57 and the inner peripheral portion of the gasket 49. The vacuum spring 57 is a coiled compression spring acting between the seal plate 54 and the spring seat 36.

A seal plate 58 is disposed between the pressure spring 61 and the outer peripheral portion of the gasket 49. The spring 61, which is a coiled compression spring, may be confined, at its upper end, in a concentric groove 62 formed in the mounting flange 42 of the insert 41.

The insert 41 is provided with a plurality of peripherally spaced apart venting apertures 64. When pressure in the gasoline tank closed by the cap 14 becomes excessive, the bead 50 moves away from the seat 34 to permit air and vapors to move about the bead and through the apertures 64 and over the top of the insert 41 as indicated by the arrows 65. When an excessive vacuum condition exists in the tank, the bead 51 moves inwardly from the seat 45 to permit air to move past the bead 51, through the grooves 47 and the aperture 37 into the tank.

The two-way valve action just discussed is fully disclosed in a companion application Ser. No. 307,821 filed Nov. 20, 1972 herewith by Mr. Robert Rogers.

In the embodiment of FIG. 2, the shell 25 is connected to the housing 16 for rotation relative to the axis of the housing by the inturned portion 28 engaging the axially inner side of the flange 17. Other techniques, of course, may be used for connecting the shell 25 to the housing 16. In FIG. 6, an outer peripheral portion of the shell 25 is shown having an enlarged inner skirt portion 28a which may be formed to have a plurality of radially inwardly extending indentations such as indicated at 70 to capture an annular flat ring 71 against the axially inner side of the flange 17. In FIG. 7, there is shown a portion of the shell 25 which has an enlarged inner skirt portion 28b turned in as indicated at 28c to capture an annular angle bracket 72 having a radially and peripherally extending flange 73 which engages the axially inner side of the flange 17. Thus, in the illustrative embodiments, the shell 25 includes means engaging the axially inner side of the flange 17 to connect the shell to the housing 16 for relative rotation about the axis of the housing.

Figure 3:
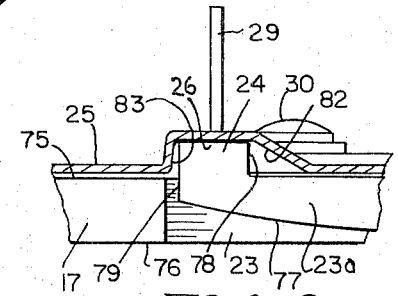
FIG. 3 is a fragmentary sectional view taken from FIG. 1 generally along the lines 3—3.

Thus, the dimension between the axially outer surface 75 and the axially inner surface 76 of the flange 17 is a control dimension such that the combined axial thickness of the distal end portion of each finger 23a and the lug 24 at its distal end must not be substantially greater than the thickness of the flange 17 because the lug must move relatively freely from pocket 26 to pocket 26 in the shell 25. As best seen in FIGS. 3, 5 and 6, the axially inner side of each finger 23a inclines axially outwardly from its proximal end to its distal end as indicated at 77. This tapering will permit the lug 24 to be cammed inwardly (downwardly in FIGS. 3, 5 and 6) so that it will not protrude axially outwardly from the side 75 of the flange 17.

The lug 24, in the illustrative embodiment, is generally rectangularly shaped having abrupt, axially extending trailing and leading edges 78, 79. The radially inner and outer surfaces 80, 81 of each lug are peripherally extending to follow the curvatures of the slits 23 and the outer peripheral edge of the flange 17 as best seen in FIG. 4.

Each pocket 26 is formed with a camming surface 82 at its trailing edge as the shell 25 is turned in the direction which advances the thread 19 into engagement with the thread 12, i.e., the clockwise direction as viewed in FIG. 1. The leading edge or end of the pocket 26 is an abrupt, axially extending surface as indicated at 83 in FIG. 3. When the shell 25 is turned counterclocksise, the abrupt surface 83 firmly engages and pushes on the abrupt surface 79 to move the housing 16 counterclockwise with the shell. Thus, there is a firm driving connection between the shell 25 and the housing 16 in the direction which disengages the thread 19 from the thread 12, i.e., the direction which moves the seal 22 axially away from the lip 13.

The camming surface 82 of each pocket 26 is proportioned and designed such that, when the shell 25 and housing 16 are being turned in a clockwise direction and there is a predetermined torque resistance to rotation of the housing 16, the lug 24 will be cammed axially inwardly to permit the shell 25 to move clockwise relative to the housing 16. Since there are four equally peripherally spaced pockets 26 and two equally peripherally spaced lugs 24, when the lugs 24 are cammed inwardly, the shell will move 90° relative to the housing 16 before the lugs will engage another set of pockets 26.

The said predetermined torque resistance at which the lugs 24 will be cammed inwardly is set at a level which will prevent overcompression of the sealing ring 22. The predetermined torque resistance will, of course, be sufficient to provide a proper seal between the housing 16 and the lip 13.

In the illustrative and preferred embodiment, the housing 16 is integrally formed by a molding process to provide the shank 18, flange 17, fingers 23a and lugs 24 as well as the valve passageway extending axially through the housing 16. Acceptable materials from which the housing 16 may be molded are Acetal DELRIN 100 or CELCON M-2504. The shell 25, of course, may be formed from sheet metal using conventional sheet metal cap forming techniques.

I claim:

1. A valved cap for closing a chamber having a filler neck formed to provide an internal thread and a peripherally extending lip at its mouth, said valve cap comprising a housing formed to provide, at its outer end portion, an outwardly and peripherally extending flange and, extending axially inwardly from said flange, a shank with a mating external thread on the outer periphery thereof, said flange providing at least one resilient finger having a lug at its distal end, a concentric sealing ring disposed adjacent said flange for sealing engagement with such a lip, a shell covering at least said outer portion of said housing, said shell being rotatable relative to said housing about the axis of said shank, said shell providing at least one pocket for receiving said lug and providing a driving connection between said shell and said housing, said pocket being formed with a camming surface at its trailing end when said shell is turned in one direction to advance the shank into engagement with such a filler neck and an abrupt surface at its leading end, said camming surface being effective to cam said lug out of said pocket to break the driving connection between said shell and said housing when the torque resistance to rotation of said housing in said one direction exceeds a predetermined level.

2. The invention of claim 1 in which said finger extends peripherally about a portion of said flange, said lug extending axially outwardly from the distal end of said finger.

3. The invention of claim 1 in which said shell provides a plurality of said pockets equally peripherally spaced about said axis, whereby, when said lug is cammed out of one of said pockets, said shell rotates in said one direction relative to said housing until said lug engages the next adjacent pocket.

4. The invention of claim 3 in which there are four of said pockets spaced 90° apart and two of said fingers diametrically opposed with said lugs spaced 180° apart.

5. The invention of claim 2 in which said pocket opens axially inwardly, said pocket being disposed at the outer peripheral edge portion of said shell.

6. The invention of claim 5 in which said shell includes means engaging the axially inner side of said flange to connect said shell to said housing for said relative rotation.

7. The invention of claim 6 in which the axially inner side of said finger inclines axially outwardly from its proximal end to its distal end, the combined axial thickness of said lug and the distal end of said finger being not substantially greater than the axial thickness of said flange such that said lug and distal end can be cammed axially inwardly from said pocket to move relative to said shell and said means engaging the axially inner side of said flange.

8. The invention of claim 2 in which said housing is integrally molded of plastic to provide said flange, shank, finger and lug at the distal end of said finger, and a valved venting passageway extending axially therethrough.

9. The invention of claim 2 in which said lug is generally rectangularly shaped having axially extending leading and trailing edges, the distal end of said finger and said lug being resiliently movable axially inwardly relative to said flange to disengage said pocket.

10. The invention of claim 2 in which said finger is proportioned and designed such that said lug normally extends axially outwardly from the outer side of said flange into engagement with said pocket, the distal end portion of said finger being resiliently movable axially inwardly so that said lug does not protrude axially beyond the outer surface of said flange.

11. A cap for closing a chamber having a filler neck formed to provide a thread and a peripherally extending lip at its mouth, said valve cap comprising a housing member formed with a mating thread, said housing member having an outer end portion and an inner end portion, a concentric sealing ring disposed adjacent said outer end portion for sealing engagement with such a lip, said housing providing at least one resilient finger having an engaging portion at its distal end, and a shell covering at least said outer portion of said housing, said shell being rotatable relative to said housing about the axis of said shank, said shell providing a cooperating engaging portion in the peripheral path of said first-mentioned engaging portion, said engaging portions being proportioned and designed to provide a torque-limited driving connection between said housing and said shell when said shell is turned in the direction which advances said sealing ring toward such a lip and a firm driving connection between said housing and shell when said shell is turned in the opposite direction which moves said sealing ring away from such a lip.

* * * * *